US012792908B2

(12) United States Patent
Choo et al.

(10) Patent No.: US 12,792,908 B2
(45) Date of Patent: Nov. 10, 2026

(54) METHOD FOR SOLVING PROBLEM AND SYSTEM THEREOF

(71) Applicant: SAMSUNG SDS CO., LTD., Seoul (KR)

(72) Inventors: Jin Ho Choo, Seoul (KR); Yeong Dae Kwon, Seoul (KR); Ji Hoon Kim, Seoul (KR); Jeongwoo Jae, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 746 days.

(21) Appl. No.: 18/144,505

(22) Filed: May 8, 2023

(65) Prior Publication Data

US 2023/0368020 A1 Nov. 16, 2023

(30) Foreign Application Priority Data

May 12, 2022 (KR) ........................ 10-2022-0058490

(51) Int. Cl.
*G06N 3/08* (2023.01)

(52) U.S. Cl.
CPC ..................................... *G06N 3/08* (2013.01)

(58) Field of Classification Search
CPC ........................................................ G06N 3/08
See application file for complete search history.

(56) References Cited

U.S. PATENT DOCUMENTS 8,260,738 B2 * 9/2012 MacLennan ............ G06F 17/18 706/59
8,543,648 B1 * 9/2013 Rhodes ............... G06F 16/9027 709/205
9,391,738 B2 7/2016 Dvoretzki et al.
11,080,170 B1 * 8/2021 Dewitt ................ G06F 11/3457
11,093,864 B1 * 8/2021 Reese ................. G06F 16/2379
11,226,885 B1 * 1/2022 Gasser ................ G06F 9/45533
11,238,097 B2 2/2022 Tian et al.
(Continued)

FOREIGN PATENT DOCUMENTS

JP 2020-38478 A 3/2020
KR 10-2045567 B1 11/2019
KR 10-2021-0093483 A 7/2021

OTHER PUBLICATIONS

Kwon et al., "POMO: Policy Optimization with Multiple Optima for Reinforcement Learning, " 34th Conference on Neural Information Processing Systems (NeurIPS 2020), 2020, Total 11 pages.
(Continued)

*Primary Examiner* — Jeremy L Stanley
(74) *Attorney, Agent, or Firm* — Sughrue Mion, PLLC

(57) ABSTRACT

A method for solving a problem and a system thereof are provided. The method according to some embodiments includes setting at least one current search node on a search tree corresponding to a solution space of a target problem; selecting candidate search nodes from among child nodes of the at least one current search node, a number of the candidate search nodes being equal to a number of items inferred by a machine-trained model; determining at least one next search node from among the candidate search nodes based on results of search simulation for the candidate search nodes; and determining a solution to the target problem based on a result of a search using the at least one next search node.

14 Claims, 23 Drawing Sheets

(56) References Cited

U.S. PATENT DOCUMENTS

| | | | | |
|---|---|---|---|---|
| 12,327,071 | B1 * | 6/2025 | Storey | G06F 30/20 |
| 2011/0035087 | A1 * | 2/2011 | Kim | G05D 1/0274<br>701/25 |
| 2011/0320184 | A1 * | 12/2011 | Beyer | G06F 16/24568<br>703/22 |
| 2015/0091909 | A1 * | 4/2015 | Ajwani | H04L 45/484<br>345/440 |
| 2018/0032864 | A1 * | 2/2018 | Graepel | G06N 3/0464 |
| 2018/0196892 | A1 * | 7/2018 | Viana | G06N 7/01 |
| 2019/0147350 | A1 * | 5/2019 | Bai | G06N 3/08<br>706/25 |
| 2019/0258904 | A1 * | 8/2019 | Ma | G06N 3/0985 |
| 2020/0372080 | A1 * | 11/2020 | Osogami | G06F 16/90335 |
| 2021/0150771 | A1 * | 5/2021 | Huang | G06N 5/046 |
| 2021/0183522 | A1 * | 6/2021 | Lintereur | G06N 3/0442 |
| 2021/0241916 | A1 * | 8/2021 | Wexler | A61B 5/6802 |
| 2021/0370980 | A1 * | 12/2021 | Ramamoorthy | G06N 20/00 |
| 2021/0373961 | A1 | 12/2021 | Syed et al. | |
| 2022/0044138 | A1 | 2/2022 | Lin | |
| 2022/0138560 | A1 * | 5/2022 | Chyou | G06N 3/09<br>706/21 |
| 2022/0163969 | A1 * | 5/2022 | Li | G08G 1/096811 |
| 2022/0172802 | A1 * | 6/2022 | Konstantinov | G16C 20/70 |
| 2022/0402710 | A1 * | 12/2022 | Pidaparthi | B25J 9/1671 |
| 2023/0041975 | A1 * | 2/2023 | Caldwell | B60W 60/0027 |
| 2023/0112911 | A1 * | 4/2023 | Yoshida | G06N 5/045<br>706/45 |
| 2023/0128776 | A1 * | 4/2023 | Hackett | G06N 5/01<br>706/47 |
| 2023/0130239 | A1 * | 4/2023 | Hackett | G06N 20/00<br>706/12 |
| 2023/0153681 | A1 * | 5/2023 | Kyanam | G06N 5/01<br>706/12 |
| 2023/0182014 | A1 * | 6/2023 | Dai | A63F 13/65<br>463/6 |
| 2023/0217264 | A1 * | 7/2023 | Challita | G06N 7/01<br>370/329 |
| 2023/0271318 | A1 * | 8/2023 | Gao | B25J 9/1605<br>700/245 |
| 2023/0306165 | A1 * | 9/2023 | Liu | G06F 30/13 |
| 2023/0373336 | A1 * | 11/2023 | Malisani | B60L 53/66 |
| 2024/0161005 | A1 * | 5/2024 | Kinar | G06N 5/045 |
| 2024/0187879 | A1 * | 6/2024 | Bizzarri | H04W 16/22 |

OTHER PUBLICATIONS

Hottung et al., "Efficient Active Search for Combinatorial Optimization Problems," ICLR 2022, arXiv:2106.05126v3 [cs.LG], Mar. 2022, Total 13 pages.

* cited by examiner

FIG. 10

```
procedure TREE_SEARCH ( π_θ , R )
    setB ← {root node}

    for t = 1 ...N do
        setE ← EXPANSION(setB)
        setEV ← SIMULATION(setE, R)
        setNextB ← SELECTNEXTB(setEV)
        setB ← setNextB
    end for

    τ ← SEELCT FINAL SOLUTION(setB, R)
    return τ
end procedure
```

FIG. 11

```
procedure EXPANSION ( setB )
    setE ← {}

    for ∀b ∈ setB do
        p_θ(a|s_b) ← π_θ(s_b)
        setE ← setE ∪ SelectExpansionNodes(p_θ(a|s_b), F)
    end for

    return setE
end procedure
```

FIG. 12

```
procedure SIMULATION ( setE )
    setEV ← {}

    for ∀e ∈ setE do
        v ← ValueEstimation(e, π_θ, R)
        setEV ← setEV ∪ { (e, v) }
    end for

    return setEV
end procedure
```

FIG. 14 procedure $\mathrm{SelectExpansionNodes}_{\mathrm{Greedy}}\,(\,p_\theta(a|s_b), F\,)$ $\quad sorted\_nodes[] \leftarrow argsort_a(p(a|s_b),\ descending)$ $\quad setF \leftarrow \{\, sorted\_nodes[1], sorted\_nodes[2], \ldots, sorted\_nodes[F]\,\}$ $\quad return\ setF$ end procedure

FIG. 16 procedure SelectExpansionNodes$_{prob}$ ( $p_\theta(a|s_b), F$ )

$\quad setF \leftarrow \{\}$ $\quad$ while $length(setF) < F$ do

$\quad\quad a_f \sim p_\theta(a|s_b)$ $\quad\quad$ if $a_f \notin setF$ do

$\quad\quad\quad setF \leftarrow setF \cup \{ a_f \}$ $\quad\quad$ end if

$\quad$ end while

$\quad$ *return setF* end procedure

FIG. 18 procedure $\text{ValueEstimation}_{Rollout}(\text{e}, \pi_\theta, R)$ $\tau_e \leftarrow s_e$ $n \leftarrow e$ while $n$ *has child* do

$p_\theta(a|s_n) \leftarrow \pi_\theta(s_n)$ $selected \leftarrow \underset{a}{argmax}\, p_\theta(a|s_n)$ $\tau_e \leftarrow (\tau_e,\ selected)$ $n \leftarrow selected$ end while

$r \leftarrow R(\tau_e)$

*return* $r$ end procedure

FIG. 19 procedure ValueEstimation$_{sampling}$( e, $\pi_\theta$, $R$ )

$r_{best} \leftarrow -\infty$ for $s = 1 ... K$ do

$\tau_e \leftarrow s_e$ $n \leftarrow e$ while $n$ *has child* do

$p_\theta(a|s_n) \leftarrow \pi_\theta(s_n)$ $selected \sim p_\theta(a|s_n)$ $\tau_e \leftarrow (\tau_e,\ selected)$ $n \leftarrow selected$ end while

$r \leftarrow R(\tau_e)$ $r_{best} \leftarrow \max(r_{best}, r)$ end for

*return* $r_{best}$ end procedure

METHOD FOR SOLVING PROBLEM AND SYSTEM THEREOF

CROSS-REFERENCE TO RELATED APPLICATION

This application claims priority from Korean Patent Application No. 10-2022-0058490 filed on May 12, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to a method for solving problem and system thereof, and more particularly, to a method of efficiently deriving a solution to a given problem with the use of machine-trained model and a tree search technique and a system performing the method.

2. Description of the Related Art

As the solution space for a combinatorial optimization problem can be expressed as a tree structure, the process of deriving a solution to such problem may be considered searching a solution space tree. It is almost impossible or very costly to search the entire solution space for a combinatorial optimization problem, and thus, various techniques such as, for example, greedy search or Monte Carlo tree search (MCTS) have been suggested to efficiently search a solution space tree.

In recent years, research into ways to solve a combinatorial optimization problem using both a machine-trained model (or trained machine-learning model) and a tree search technique has received further attention. For example, a method has been suggested to quickly derive a solution to a combinatorial optimization solution by applying the greedy search technique to a machine-trained model trained for continuously inferring items that constitute the solution to the combinatorial optimization problem. This method, however, cannot guarantee the quality of the derived solution due to the limitations of the greedy search technique.

SUMMARY

An aspect of an example embodiment of the present disclosure provides a problem-solving method capable of efficiently solving a given problem using a machine-trained model and a tree search technique and a system performing the problem-solving method.

An aspect of an example embodiment of the present disclosure provides a problem-solving method capable of deriving a high-quality solution to a given problem using a machine-trained model and a tree search technique and a system performing the problem-solving method.

An aspect of an example embodiment of the present disclosure provides a problem-solving method capable of accurately selecting candidate search nodes to be searched from a search tree corresponding to the solution space for a given problem and a system performing the problem-solving method.

An aspect of an example embodiment of the present disclosure provides a problem-solving method capable of accurately determining a next node to be searched on a search tree corresponding to the solution space for a given problem and a system performing the problem-solving method.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an example embodiment of the present disclosure, provided is a method for solving a target problem using a machine-trained model, the method being performed by at least one computing device and including: setting at least one current search node on a search tree corresponding to a solution space of a target problem; selecting candidate search nodes from among child nodes of the at least one current search node, a number of the candidate search nodes being equal to a number of items inferred by a machine-trained model; determining at least one next search node from among the candidate search nodes based on results of search simulation for the candidate search nodes; and determining a solution to the target problem based on a result of a search using the at least one next search node.

The machine-trained model may be configured to perform inferencing in an autoregressive manner.

The setting the at least one current search node may include setting a plurality of current search nodes, the plurality of current search nodes being on a same level on the search tree.

A number of next search nodes may be equal to a number of the plurality of current search nodes.

The at least one current search node may include a first node and a second node, and a search of a first subtree having the first node as its root node and a search of a second subtree having the second node as its root node may be performed in parallel.

The at least one current search node may include a first node and a second node that are on a same level on the search tree, and a number of candidate search nodes selected from among child nodes of the first node may be equal to a number of candidate search nodes selected from among child nodes of the second node.

The selecting the candidate search nodes may include selecting the candidate search nodes based on confidence scores of items acquired as a result of inferencing performed by the machine-trained model.

The selecting the candidate search nodes may include: performing sampling using confidence scores of items acquired as a result of inferencing performed by the machine-trained model; and selecting the candidate search nodes based on a result of the sampling.

The selecting the candidate search nodes may include selecting the candidate search nodes using another machine-trained model, and the another machine-trained model may be a model trained to receive information of the child nodes and infer the candidate search nodes based on the received information.

The candidate search nodes may include a first candidate search node and a second candidate search node, and search simulation for the first candidate search node and search simulation for the second candidate search node may be performed in parallel.

The determining the at least one next search node may include: deriving predicted paths for the candidate search nodes by performing search simulation, which selects the at least one next search node based on confidence scores of items acquired as a result of inferencing performed by the machine-trained model; evaluating predicted solutions corresponding to the predicted paths using an evaluation function associated with the target problem; and determining the at least one next search node from among the candidate search nodes based on results of the evaluating.

The determining the at least one next search node may include: evaluating values of the candidate search nodes via sampling-based search simulation; and determining the at least one next search node from among the candidate search nodes based on the evaluated values, and the evaluating the values of the candidate search nodes may include: deriving a plurality of predicted paths for a particular candidate search node by repeatedly performing the search simulation using, as sampling probabilities, confidence scores of items acquired as a result of inferencing performed by the machine-trained model; evaluating predicted solutions corresponding to the plurality of predicted paths using an evaluation function associated with the target problem; and determining a value of the particular candidate search node based on results of the evaluating the predicted solutions.

The at least one next search node may include a first node and a second node, and the determining the solution to the target problem may include: deriving a first path and a second path passing through the first node and the second node, respectively, on the search tree; evaluating solutions corresponding to the first path and the second path using an evaluation function associated with the target problem; and determining the solution to the target problem based on results of the evaluating.

The method may further include acquiring an additionally-trained machine-trained model using the determined solution to the target problem; and deriving the solution to the target problem again using the acquired machine-trained model.

According to an aspect of an example embodiment of the present disclosure, provided is a system for solving a target problem including: at least one processor; and a memory configured to store program code and a machine-trained model associated with a target problem, the program code including: setting code configured to cause the at least one processor to set at least one current search node on a search tree corresponding to a solution space of the target problem; selecting code configured to cause the at least one processor to select candidate search nodes from among child nodes of the at least one current search node, a number of the candidate search nodes being equal to a number of items inferred by the machine-trained model; first determining code configured to cause the at least one processor to determine at least one next search node from among the candidate search nodes based on results of search simulation for the candidate search nodes; and second determining code configured to cause the at least one processor to determine a solution to the target problem based on a result of a search using the at least one next search node.

According to an aspect of an example embodiment of the present disclosure, provided is a non-transitory computer-readable recording medium storing program code executable by at least one processor, the program code including: setting code configured to cause the at least one processor to set at least one current search node on a search tree corresponding to a solution space of a target problem; selecting code configured to cause the at least one processor to select candidate search nodes from among child nodes of the at least one current search node, a number of the candidate search nodes being equal to a number of items inferred by a machine-trained model; first determining code configured to cause the at least one processor to determine at least one next search node from among the candidate search nodes based on results of search simulation for the candidate search nodes; and second determining code configured to cause the at least one processor to determine a solution to the target problem based on a result of a search using the at least one next search node.

According to the aforementioned and other embodiments of the present disclosure, a search may be conducted by selecting a plurality of candidate search nodes on a search tree corresponding to the solution space of a target problem, evaluating the values of the candidate search nodes via search simulation, and determining a next search node based on the results of the evaluation. Accordingly, the solution space of the target problem may be efficiently searched, and the quality of each derived solution to the target problem may be improved.

Also, search simulation may be performed until a leaf node is reached from the candidate search nodes, and predicted solutions (i.e., solutions corresponding to predicted paths) derived as a result of the search simulation may be evaluated using an evaluation function associated with the target problem. The results of the evaluation may be determined as the values of the candidate search nodes. Accordingly, the values of the candidate search nodes may be accurately evaluated, and thus, the quality of each derived solution to the target problem may be considerably improved.

Also, the performance of a machine-trained model may be gradually improved by additionally training the machine-trained model using each derived solution to the target problem as training data, and as a result, an even higher-quality solution may be derived for the target problem.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIGS. 10 through 12 show exemplary pseudo codes for the problem-solving method of FIG. 4;

FIG. 14 shows an exemplary pseudo code for the method of FIG. 13;

FIG. 16 shows an exemplary pseudo code for the method of FIG. 15;

FIG. 18 shows an exemplary pseudo code for the method of FIG. 17;

FIG. 19 shows an exemplary pseudo code for a method of evaluating the values of candidate search nodes according to another embodiment of the present disclosure;

DETAILED DESCRIPTION

Figure 1:
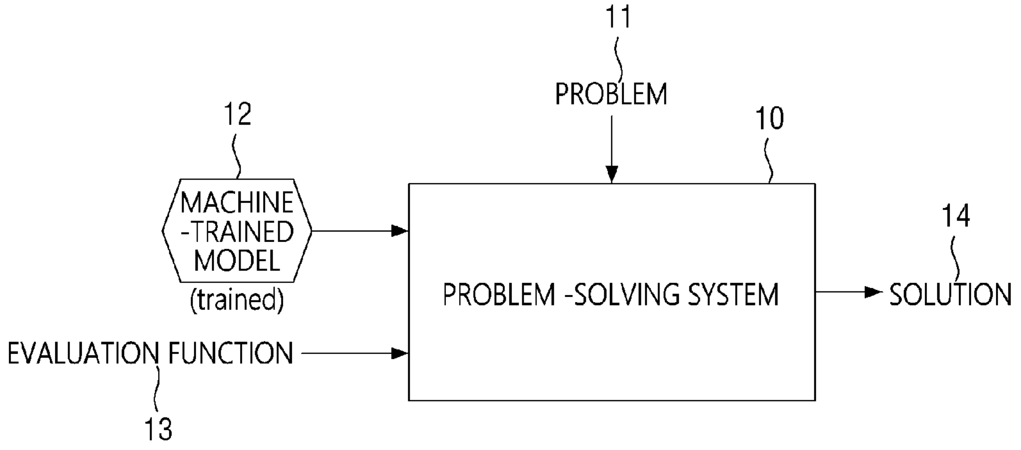
FIG. 1 is a block diagram of a problem-solving system according to some embodiments of the present disclosure and explains the input and output of the problem-solving system.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will be described with reference to the attached drawings.

FIG. 1 is a block diagram of a problem-solving system according to some embodiments of the present disclosure and explains the input and output of the problem-solving system.

Referring to FIG. 1, a problem-solving system may be a system solving a target problem 11 using a machine-trained model 12 (or a learned model). Specifically, the problem-solving system 10 may efficiently search the solution space for the target problem 11 using the machine-trained model 12, which is associated with the target problem 11, and a tree search technique, and may derive at least one solution 14 to the target problem 11 as a result of the searching. Also, the problem-solving system 10 may improve the probability (or possibility) of a high-quality solution by using an evaluation function 13, which is associated with the target problem 11, during the search of the solution space for the target problem 11. It will be described later how the problem-solving system 10 derives the solution 14 to the target problem 11 based on tree search with reference to FIG. 4 and the subsequent figures.

As the problem-solving system 10 is considered a system for deriving an optimal solution to the target problem 11 based on tree search, the problem-solving system 10 may also be referred to as a tree search system 10 or an optimal solution derivation system 10.

Examples of the target problem 11, which is a problem to be solved or a task, may include various types of problems (or tasks) that may be solved via stepwise or continuous inferencing performed by the machine-trained model 12 (or that have a tree-shaped solution space. The examples of the target problem 11 may include various types of combinatorial optimization problems such as a traveling salesman problem (TSP), a capacitated vehicle routing problem (CVRP), a knapsack problem, and the like. The examples of the target problem 11 may also include various problems that predict sequences, such as a machine translation problem. The machine translation problem, which is the problem of predicting an output sequence based on an input sequence, may also be considered a type of combinatorial optimization problem because each output sequence corresponds to the combination of translated words (or tokens). However, the present disclosure is not limited to these examples. Any problem having a tree-shaped solution space may be included in the examples of the target problem 11.

The machine-trained model 12, which is a model associated with the target problem 11, may be a model trained to derive the solution 14 via stepwise or continuous inferencing. For example, the machine-trained model 12 may be, but is not limited to, a model for deriving the solution 14 by performing stepwise or continuous inferencing in an autoregressive manner (i.e., using the result of a previous inferencing process to perform a current inferencing process). Specifically, when the solution 14 consists of the combination of multiple items, the machine-trained model 12 may be a model outputting the confidence scores of the multiple items in stages or continuously. The machine-trained model 12 may be, but is not limited to, a model learning a training set for the target problem 11 or a training set for a problem similar to the target problem 11, for example, a problem more universal or easier than the target problem 11. The machine-trained model 12 may be, but is not limited to, a deep learning model consisting of a complex neural network (e.g., an artificial neural network (ANN), a convolution neural network (CNN), a recurrent neural network (RNN), or a Transformer).

The evaluation function 13, which is a function associated with the target problem 11, may be the function of evaluating the quality of the solution 14, such as, for example, an objective function of a combinatorial optimization problem. The evaluation function 13 may be defined in various manners depending on a set of criteria of a user and is not particularly limited as long as it may evaluate the quality of the solution 14. For example, if the target problem 11 is a TSP, the evaluation function 13 may be the function of calculating the cost of the solution 14 (i.e., a traveling salesman's path). In another example, if the target problem 11 is a machine translation problem, the evaluation function 13 may be the function of measuring the naturalness of a translated sentence (or an output sequence), the function of calculating a similarity measure between an input sentence and the translated sentence, the function of calculating the number of words that match between the input sentence and the translated sentence, the function of grammar-checking the translated sentence, or a combination thereof.

Examples of the target problem 11 and an inferencing process performed by the machine-trained model 12 will hereinafter be described with reference to FIGS. 2 and 3.

Figure 2:
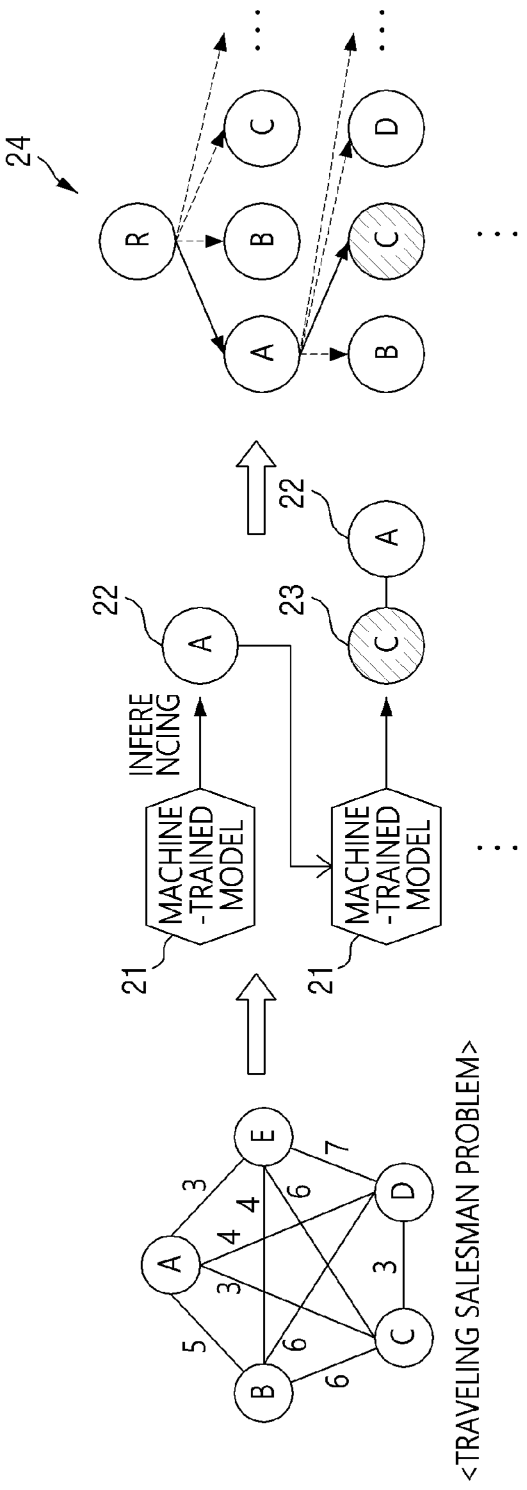
FIGS. 2 and 3 illustrate problems that may be referenced in some embodiments of the present disclosure and an inferencing process performed by a machine-trained model.

FIG. 2 illustrates a case where the target problem 11 is a TSP and assumes that solution space is searched using a greedy search technique.

Referring to FIG. 2, when the target problem 11 is a TSP, the machine-trained model 21 may be a model trained to infer places A through E that are visited, in stages or continuously. In other words, items inferred by the machine-trained model 21, for example, items 22 and 23, may be places that are visited, and the machine-trained model 21 may output the confidence scores of the items whenever performing an inferencing process. When a search (or inferencing) is performed using the greedy search technique, an item with a highest confidence score may be determined as a next search node (or subsequent search node), which is a node to be searched next to the current search node.

FIG. 2 illustrates that the places A and C are inferred as the items 22 and 23 as a result of stepwise inferencing performed by the machine-trained model 21 using the greedy search technique. In this case, the search of solution space 24 (i.e., a search tree) may be performed.

Here, the term "search tree" may also be referred to as a solution space tree or a state space tree. Each node of a search tree indicates the solved state of a problem and will hereinafter be described as corresponding to each item that constitutes a solution to the problem. For example, the confidence score of a particular node of a search tree may be understood as indicating the confidence score of a corresponding item.

Figure 3:
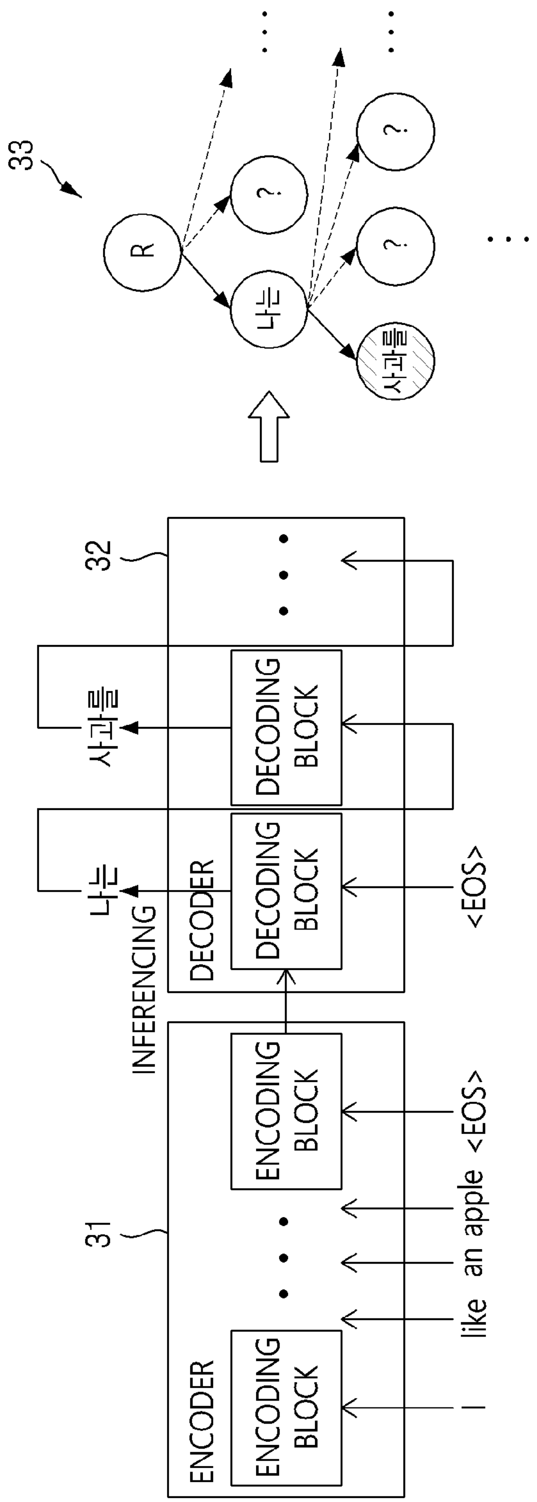

FIG. 3 illustrates a case where the target problem 11 is a machine translation problem and assumes that solution space is searched using the greedy search technique. FIG. 3 also assumes that the machine-trained model 12 consists of an encoder 31, which encodes an input sequence (i.e., a sentence to be translated) and consists of, for example, multiple RNN blocks or Transformer encoders, and a decoder 32, which infers an output sequence (i.e., a translated sentence) in an autoregressive manner and consists of, for example, multiple RNN blocks or Transformer decoders.

Referring to FIG. 3, when the target problem 11 is a machine translation problem (e.g., English to Korean), the machine-trained model 12 may be a model trained to infer words defined in a dictionary such as, for example, "나는" and "사과를", in stages or continuously based on an input sequence. In other words, items (e.g., the words "나는" and "사과를") inferred by the machine-trained model 12 may be words defined in a dictionary, and the machine-trained model 12 may output the confidence scores of items whenever performing inferencing. When a search (or inferencing) is performed using the greedy search technique, an item with a highest confidence score may be determined as a next search node.

FIG. 3 illustrates that Korean words "나는" and "사과를" are output as a result of stepwise inferencing performed by the machine-trained model 12 using the greedy search technique, and in this case, the search of solution space 33 (i.e., a search tree) may be performed.

The problem-solving system 10 may be implemented as at least one computing device. For example, all the functions of the problem-solving system 10 may be implemented in a single computing device, different functions of the problem-solving system 10 may be implemented in different computing devices, or a particular function of the problem-solving system 10 may be implemented in multiple computing devices.

Here, the term "computing device" may encompass nearly all types of arbitrary devices equipped with a computing function, and an exemplary computing device will be described later with reference to FIG. 24.

Various methods that may be performed in the problem-solving system 10 will hereinafter be described with reference to FIG. 4 and the subsequent figures.

For convenience, although not specifically mentioned, it is assumed that all steps and/or operations of each method that will hereinafter be described are performed by the problem-solving system 10. However, some of the steps/operations may actually be performed in a computing device other than the problem-solving 10.

Figure 4:
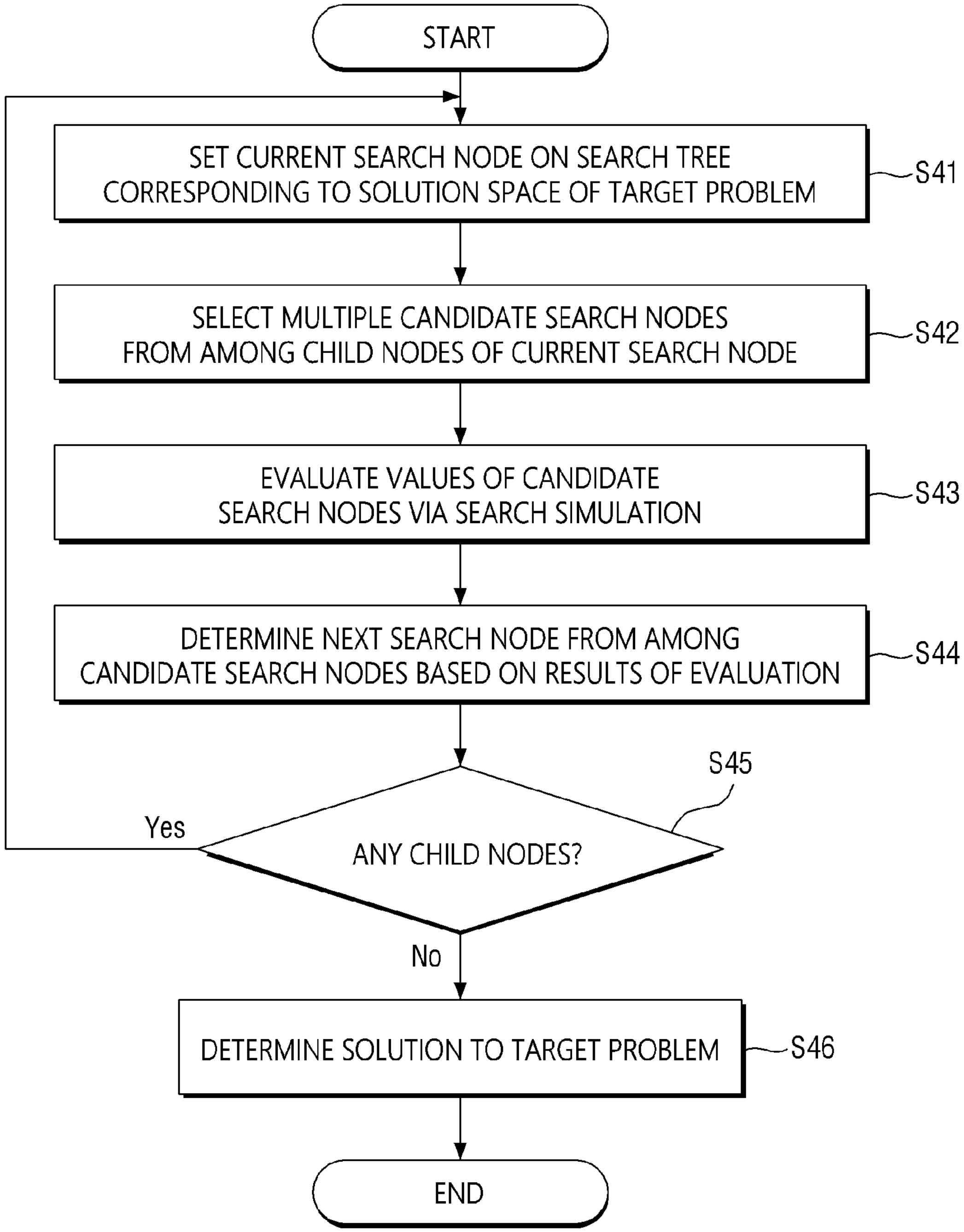
FIG. 4 is a flowchart illustrating a problem-solving method according to some embodiments of the present disclosure.

FIG. 4 is a flowchart illustrating a problem-solving method according to some embodiments of the present disclosure. The problem-solving method of FIG. 4, however, is merely exemplary, and some steps may be added to, or deleted from, the problem-solving method of FIG. 4.

Referring to FIG. 4, the problem-solving method according to some embodiments of the present disclosure may begin with S41, which is the step of setting a current search node on a search tree corresponding to the solutions pace of a target problem. The current search node is a node currently being searched. For example, the problem-solving system 10 may set a root node as a current search node and may begin a search for a solution to the target problem from the current search node. Alternatively, the problem-solving system 10 may set a particular node on the search tree as a current search node based on input from the user (e.g., when the target problem is a TSP and there is a constraint regarding a place to be visited first) and may begin the search from the current search node. Alternatively, the problem-solving system 10 may set a next search node as a current search node and may continue the search.

Figure 5:
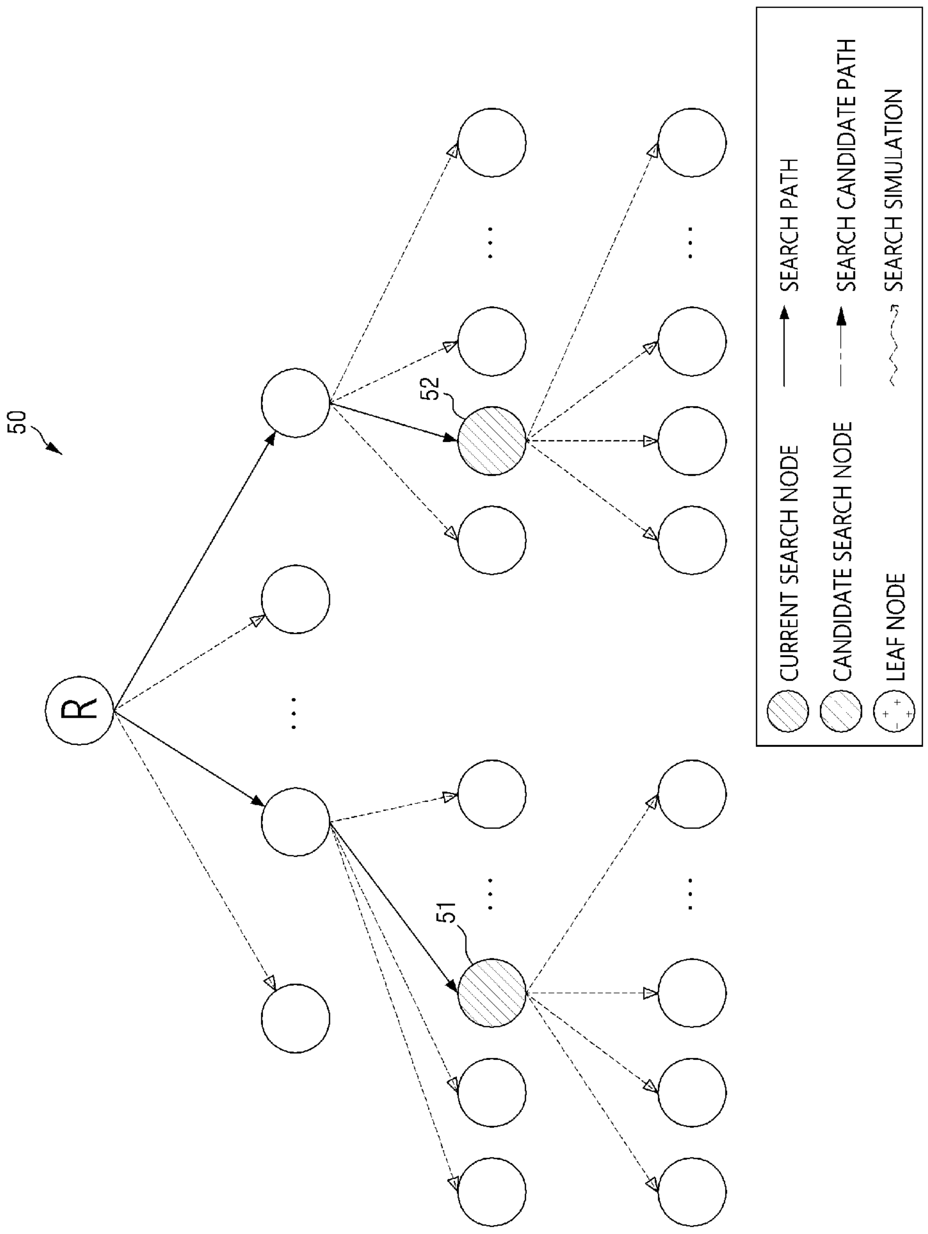
FIG. 5 illustrates the step of setting a current search node, as performed in the problem-solving method of FIG. 4.

FIG. 5 illustrates that a search for the solution to the target problem is conducted on a search tree 50 and two nodes on the same level, i.e., first and second nodes 51 and 52, are set as current search nodes. Referring to FIG. 5, the number of current search nodes that are on the same level may be 2 or greater and may be uniformly maintained or may vary.

In other words, the number of current search nodes that are on the same level refers to a search range. A search range parameter, which is a parameter indicating the search range, may have a fixed value or a fixed range of values determined in advance, or the value or the range of values of the search range parameter may vary depending on the circumstances. Specifically, the value or the range of values of the search range parameter may vary depending on the performance of the machine-trained model 12, the confidence score of each node of the search tree, and the amount of resources available for the problem-solving system 10, for example, in a case where the search range needs to be increased because there are many nodes with a confidence score of a reference level or higher or there is a plenty of resources available for the problem-solving system 10. In the example of FIG. 5, the parameter may be set to a value of 2.

When there are multiple current search nodes, as illustrated in FIG. 5, searches may be conducted in parallel for their respective current search nodes. For example, the search of a first subtree having the first node 51 as its root node and the search of a second subtree having the second node 52 as its root node may be performed in parallel by multiple computing devices or processors (e.g., graphics processing units (GPUs)). In this case, the amount of time that it takes to conduct a tree search may be considerably reduced. Here, the search of a tree (or a subtree) includes a series of processes of selecting candidate search nodes, evaluating the values of the candidate search nodes, and determining a next search node.

Referring again to FIG. 4, in S42, a plurality of candidate search nodes may be selected from among the child nodes. As described above, the number of child nodes may be the same as the number of items inferred by a machine-trained model. For example, the problem-solving system 10 may select a predefined number of candidate search nodes from among the child nodes, but a method to select the candidate search nodes may vary.

In some embodiments, the candidate search nodes may be selected based on the confidence scores of the child nodes. That is, the candidate search nodes may be selected in a greedy method. This will be described later with reference to FIGS. 13 and 14.

Alternatively, in some embodiments, the candidate search nodes may be selected using the confidence scores of the child nodes as sampling probabilities. That is, the candidate search nodes may be selected in a sampling method. This will be described later with reference to FIGS. 15 and 16.

Alternatively, in some embodiments, the candidate search nodes may be selected using another machine-trained model, which is trained to infer the candidate search nodes based on information of the child nodes. Here, the information of the child nodes may include, for example, the confidence scores of the child nodes, path information of each of the child nodes, and the confidence score of the parent node of the child nodes (i.e., the confidence score of the current search node), but the present disclosure is not limited thereto.

Figure 6:
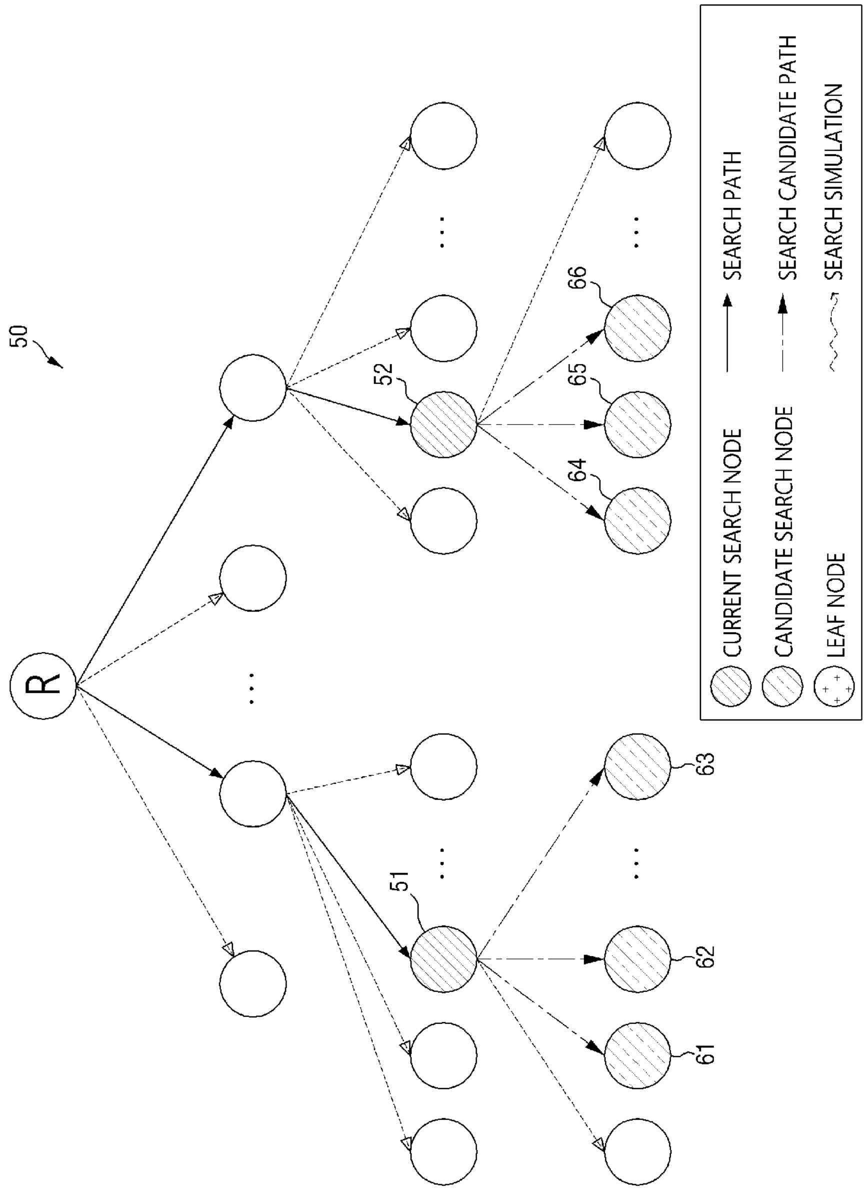
FIG. 6 illustrates the step of selecting candidate search nodes, as performed in the problem-solving method of FIG. 4.

Alternatively, in some embodiments, if there are multiple current search nodes including first and second current search nodes, a first number of candidate search nodes may be selected from among the child nodes of the first current search node, and a second number of candidate search nodes may be selected from among the child nodes of the second current search node. The first and second numbers may be the same, as illustrated in FIG. 6, or may differ from each other. For example, the ratio of the first and second numbers may be determined based on the ratio of the confidence scores of the first and second current search nodes.

Alternatively, in some embodiments, a predefined number of candidate search nodes may be selected, in a predefined manner, from among child nodes that are on the same level. For example, if the number of candidate search nodes to be selected is set to a value of 6 and the greedy method is designated, six nodes with a relatively high confidence score may be selected from among all the child nodes as the candidate search nodes.

Alternatively, in some embodiments, the candidate search nodes may be selected based on a combination of the above-described embodiments. For example, if there are multiple current search nodes including first and second current search nodes, a first number of candidate search nodes for the first current search node may be selected in the greedy method, and a second number of candidate search nodes for the second current search node may be selected in the sampling method.

The number of candidate search nodes may be fixed in advance or may vary depending on the circumstances. For example, the number of candidate search nodes may vary depending on the performance of the machine-trained model 12, the confidence scores of nodes of the search tree, and the amount of resources available for the problem-solving system 10.

FIG. 6 illustrates that the number of candidate search nodes is set to 6 and six candidate search nodes are selected for each of the first and second current search nodes 51 and 52.

Figure 7:
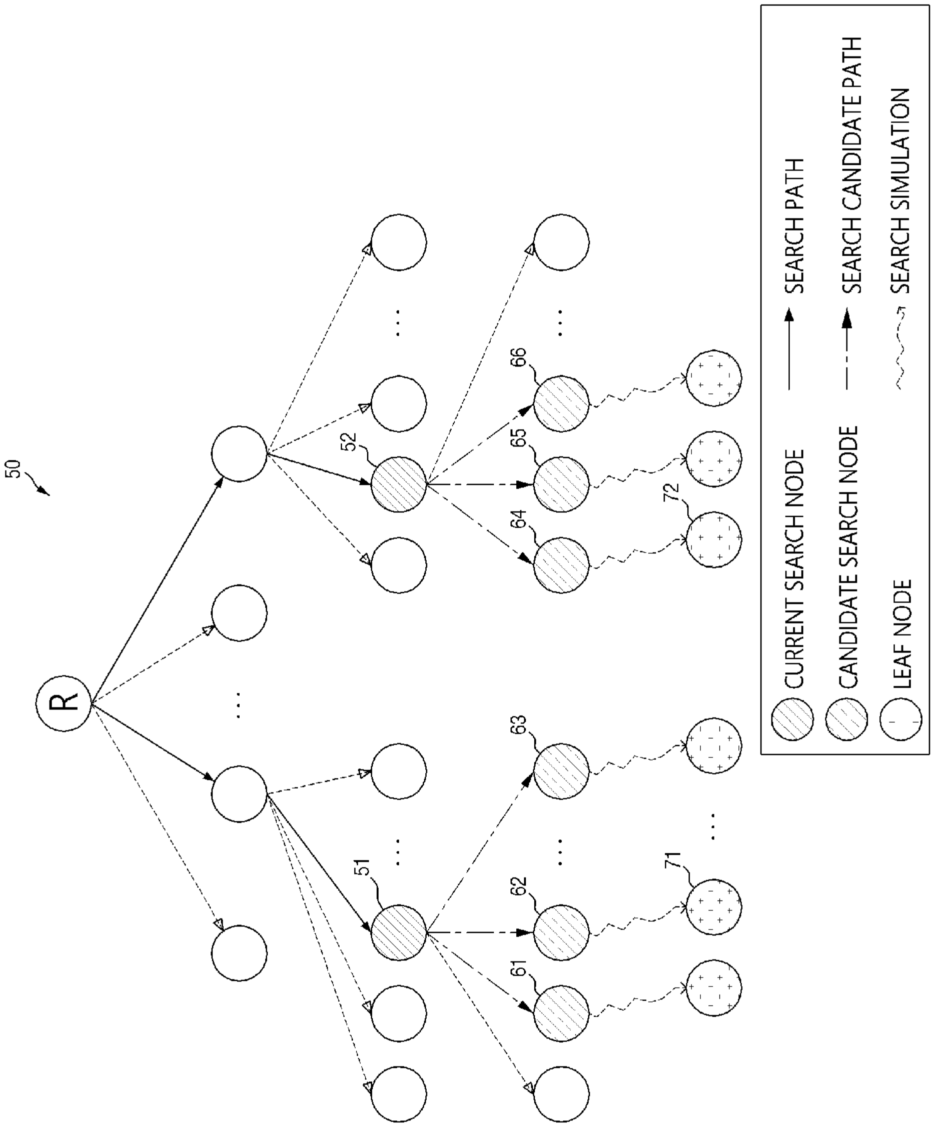
FIG. 7 illustrates the step of evaluating the values of the candidate search nodes, as performed in the problem-solving method of FIG. 4.

Referring again to FIG. 4, in S43, the values of the candidate search nodes may be evaluated via search simulation. For example, a predicted path may be derived for each of the candidate search nodes by performing search simulation on each of the candidate search nodes until a leaf node is reached, and a predicted solution corresponding to the predicted path may be evaluated using a predetermined evaluation function. Specifically, referring to FIG. 7, the problem-solving system 10 may perform search simulation on each of candidate search nodes 61 through 66 until a leaf node 71 or 72 is reached. Then, the problem-solving system 10 may determine the evaluated predicted solution as the value of each of the candidate search nodes. A method to perform search simulation may vary.

In some embodiments, search simulation may be performed in the greedy method. For example, the problem-solving system 10 may perform search simulation by continuing to select a node with a highest confidence score until the leaf node is reached. In this example, the cost of computing required for search simulation may be considerably reduced, and thus, the search of solution space may be efficiently conducted. This will be described later with reference to FIGS. 17 and 18.

Alternatively, in some embodiments, search simulation may be performed in the sampling method. For example, the problem-solving system 10 may set the confidence scores of the nodes (or the confidence scores of items corresponding to the nodes) as sampling probabilities and may perform search simulation by continuing to sample a next node until the leaf node is reached. The problem-solving system 10 may perform search simulation a predefined number of sampling times. In this case, multiple predicted paths may be derived for each of the candidate search nodes, and thus, the values of the candidate search nodes may be evaluated more accurately than in the greedy method. This will be described later with reference to FIG. 19.

Alternatively, in some embodiments, search simulation may be performed based on a combination of the above-described embodiments. For example, the problem-solving system 10 may perform search simulation, selecting a first next node in the greedy method and a second next node in the sampling method.

Search simulation operations for the respective candidate search nodes may be performed in parallel. For example, when the problem-solving system 10 is implemented as multiple computing devices or processors (e.g., GPUs), the search simulation operations for the respective candidate search nodes may be performed in parallel by the multiple computing devices or processors. In this example, the amount of time that it takes to conduct a tree search may be considerably reduced.

Figure 8:
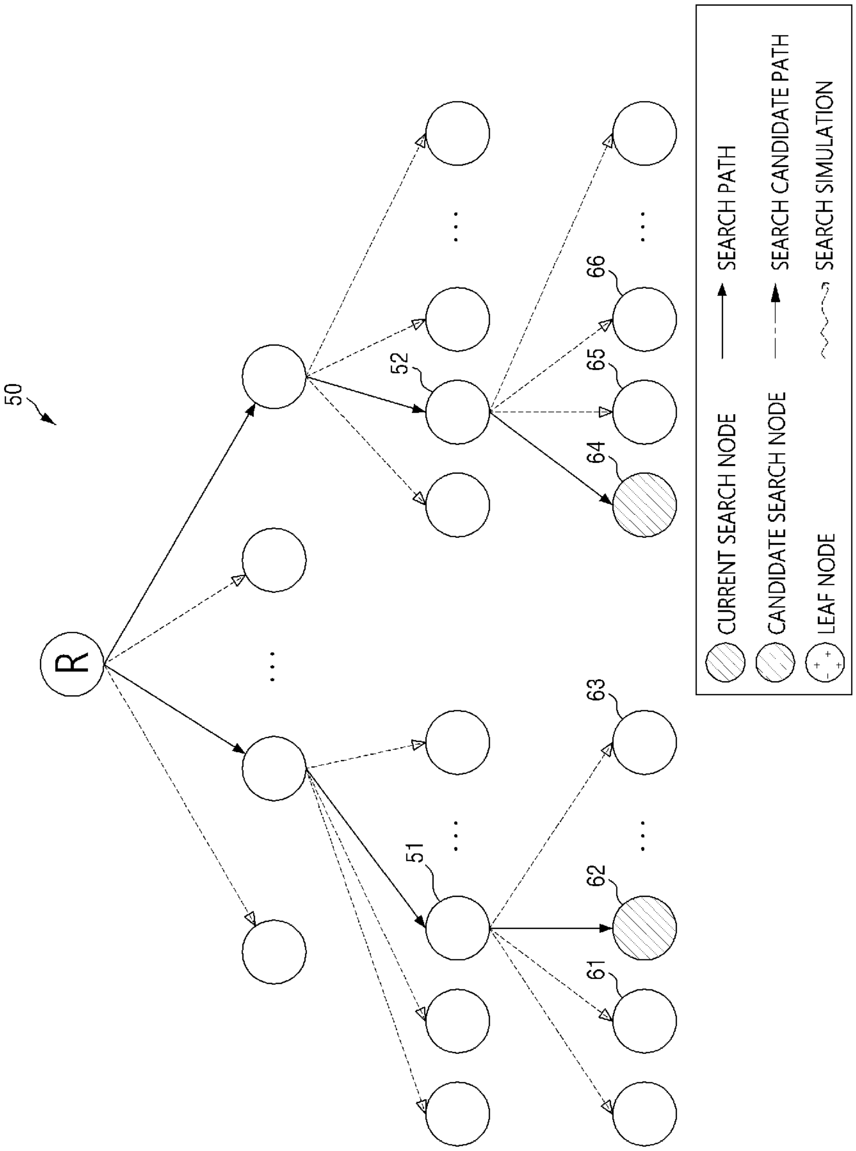
FIG. 8 illustrates the step of determining a next search node, as performed in the problem-solving method of FIG. 4.

In S44, a next search node may be determined from among the candidate search nodes based on the values of the candidate search nodes. As described above, the number of next search nodes may be determined by the value of the search range parameter. For example, referring to FIG. 8, if the search range parameter has a value of 2, the problem-solving system 10 may determine two candidate search nodes with a highest value, i.e., the candidate search nodes 62 and 64, as next search nodes.

In S45, a determination may be made as to whether the next search node has any child nodes. In other words, a determination may be made as to whether the next search node is a leaf node. If the next search node has child nodes, the search may be continued, using the next search node as a new current search node (S41 through S44). On the contrary, if the next search node has no child nodes, the search may be terminated, and the problem-solving method proceeds to S46.

In S46, a solution to the target problem may be determined. Specifically, solutions (i.e., solutions corresponding to search paths) derived from the search may be evaluated using an evaluation function associated with the target problem, and a solution to the target problem may be determined from among the derived solutions based on the results of the evaluation. For example, the problem-solving system 10 may determine a derived solution with a highest evaluation score or more than one derived solution with an evaluation score higher than a reference level as the solution to the target problem. If the evaluation scores of all the derived solutions are lower than the reference level, the problem-solving system 10 may suspend (or give up) determining the solution to the target problem or may conduct a search again only on all paths other than those that have already been searched.

Figure 9:
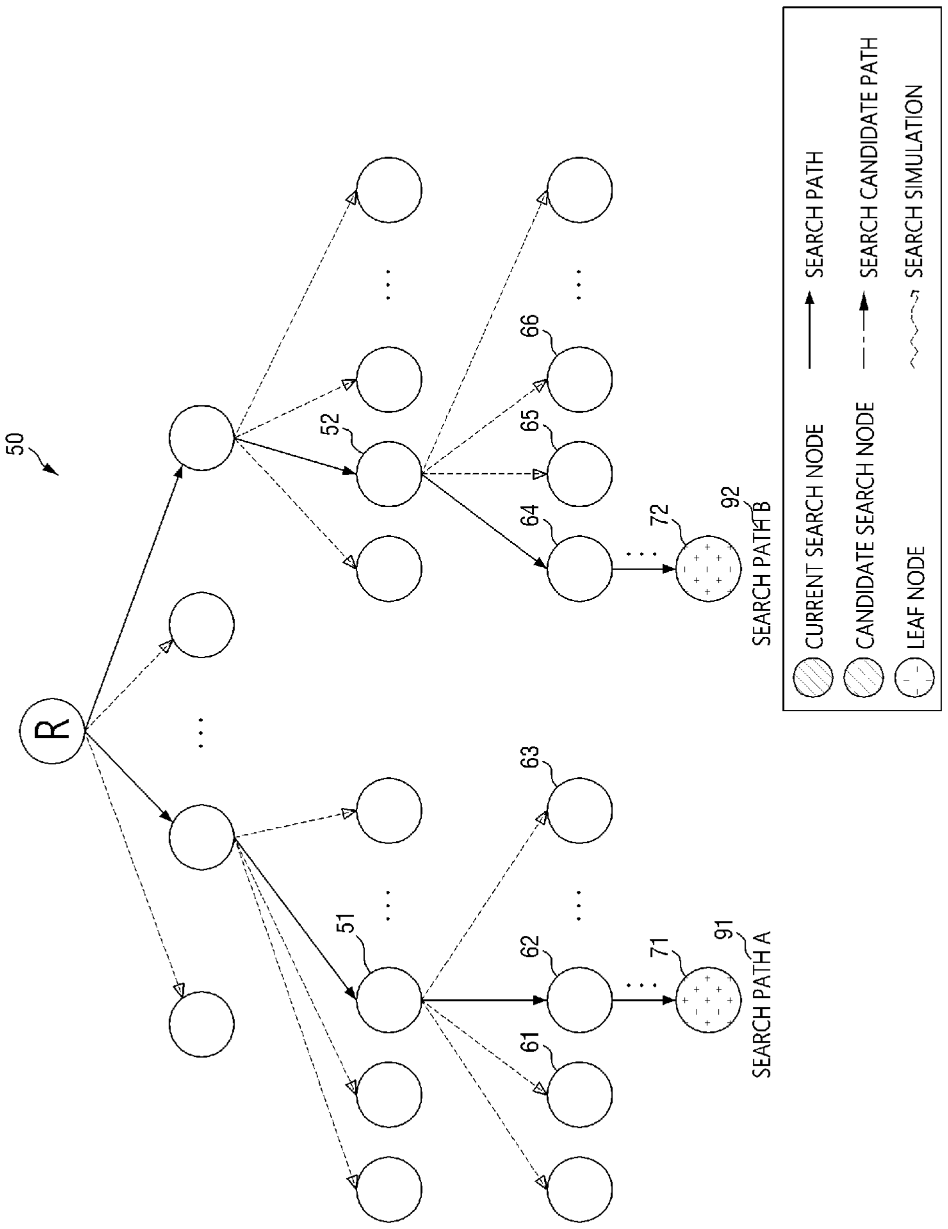
FIG. 9 illustrates the step of determining a solution to a target problem, as performed in the problem-solving method of FIG. 4.

FIG. 9 illustrates that two search paths 91 and 92 are derived from the search of the search tree 50. In this case, the problem-solving system 10 may evaluate solutions corresponding to the search paths 91 and 92 using an evaluation function and may determine the solution to the target problem based on the results of the evaluation.

FIGS. 10 through 12 show exemplary pseudo codes for the problem-solving method of FIG. 4. Specifically, FIG. 10 shows pseudo code for all the steps of the problem-solving method of FIG. 4, and FIGS. 11 and 12 show pseudo codes for S42 and S44 of FIG. 4.

Referring to FIGS. 10 through 12, $\pi_\theta$ denotes a machine-trained model, R denotes an evaluation function, $\tau$ denotes a set of searched paths, setB denotes a set of current search nodes, setE denotes a set of candidate search nodes, setEV denotes a set of candidate search nodes that have already been evaluated, N denotes the total number of levels (or the depth) of a search tree, B denotes the number of current search nodes included in a search range, E denotes the total number of candidate search nodes, F denotes the number of candidate search nodes expanded for each of the current search nodes (i.e., E=B*F if the current nodes are expanded to have the same number of candidate search nodes), $p_\theta(a|s_b)$ denotes the confidence scores of child nodes of node b, output by the machine-trained model $\pi_\theta$, and $s_b$ denotes a search path from a root node to node b (i.e., a combination of items that have been problem-solved or selected). The pseudo codes shown in FIGS. 10 through 12 and the subsequent figures may be easily understood by one of ordinary skill in the art to which the present disclosure pertains, and thus, detailed descriptions thereof will be omitted.

According to the problem-solving method of FIG. 4, a search may be conducted by selecting a plurality of candidate search nodes on a search tree corresponding to the solution space of a target problem, evaluating the values of the candidate search nodes via search simulation, and determining a next search node based on the results of the evaluation. Accordingly, the solution space of the target problem may be efficiently searched, and the quality of a derived solution to the target problem may be improved. Also, the values of the candidate search nodes may be accurately evaluated by evaluating each predicted solution derived via search simulation.

The steps of the problem-solving method of FIG. 4 will be described in further detail.

It will hereinafter be described how to select candidate search nodes with reference to FIGS. 13 through 16.

Figure 13:
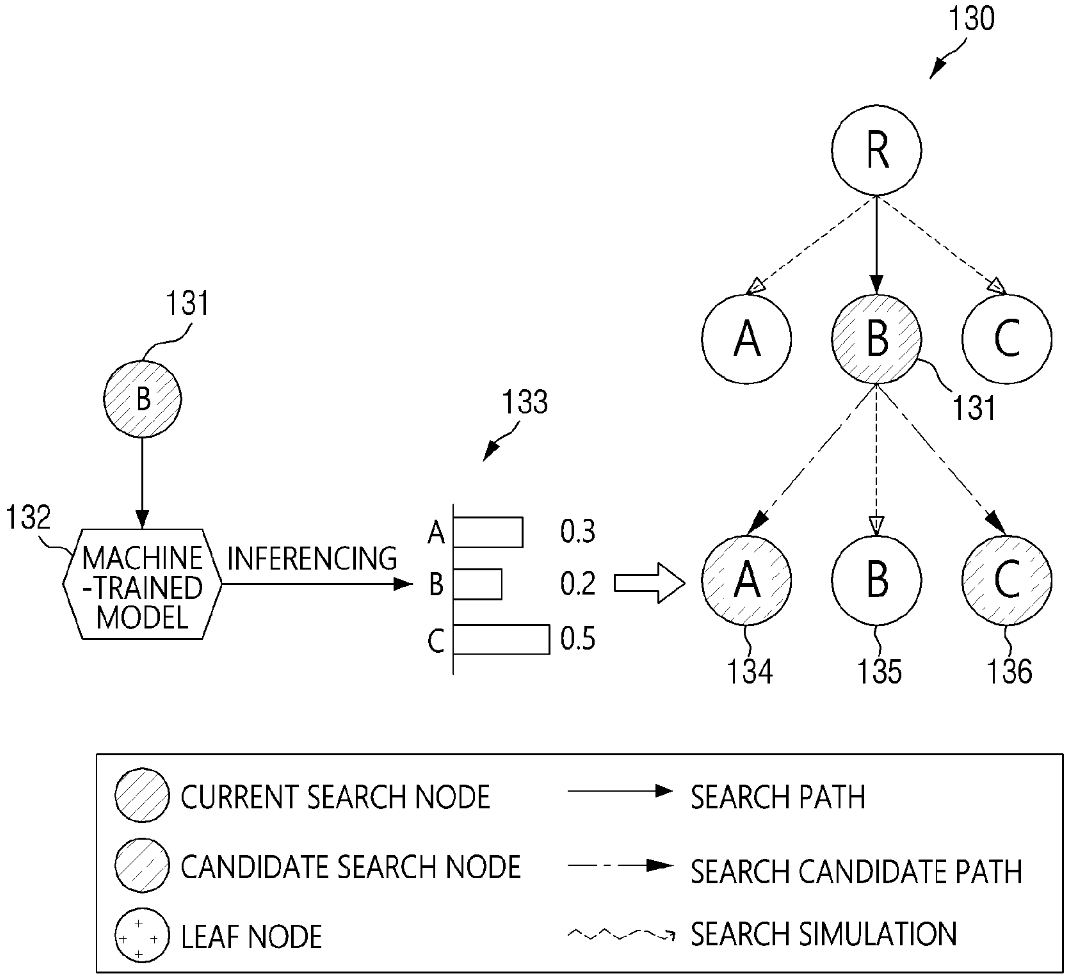
FIG. 13 illustrates a method of selecting candidate nodes according to an embodiment of the present disclosure.

FIG. 13 illustrates a method of selecting candidate search nodes according to an embodiment of the present disclosure.

The embodiment of FIG. 13 relates to a method of selecting candidate search nodes in the greedy method using confidence scores 133 from a machine-trained model 132.

Referring to FIG. 13, it is assumed that node B of a search tree 130 is a current search node 131, the machine-trained model 132 outputs the confidence scores 133, and a search range parameter is set to a value of 2. In this case, the problem-solving system 10 may select, from among child nodes 134 through 136 of the current search node 131, two child nodes with a relatively high confidence score, i.e., the child nodes 134 and 136.

According to the embodiment of FIG. 13, candidate search nodes with high values may be selected easily and accurately using the greedy method.

FIG. 14 shows an exemplary pseudo code for the method of FIG. 13. Parameters in the pseudo code of FIG. 14 are as already described above with reference to FIGS. 10 through 12.

Figure 15:
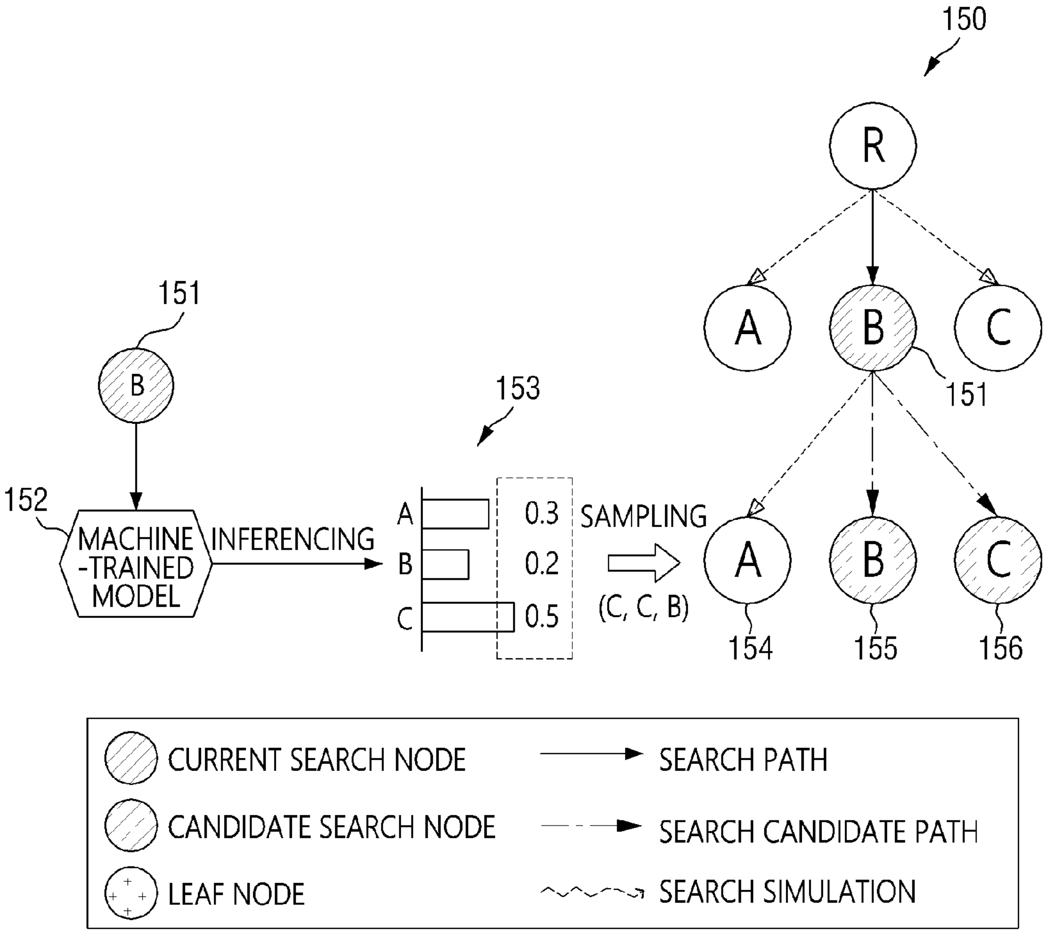
FIG. 15 illustrates a method of selecting candidate search nodes according to another embodiment of the present disclosure.

FIG. 15 illustrates a method of selecting candidate search nodes according to another embodiment of the present disclosure.

The embodiment of FIG. 15 relates to a method of selecting candidate search nodes using confidence scores 153 from a machine-trained model 152 as sampling probabilities.

Referring to FIG. 15, it is assumed that node B of a search tree 150 is a current search node 151, the machine-trained model 152 outputs the confidence scores 153, and a search range parameter is set to a value of 2. In this case, the problem-solving system 10 may perform sampling using the confidence scores 153 as the sampling probabilities of child nodes 154 through 156 of the current search node 151 and may select the child nodes 155 and 156 as candidate search nodes based on the results of the sampling.

For example, the problem-solving system 10 may repeatedly perform sampling until two non-duplicate nodes are selected from among the child nodes 154 through 156. FIG. 16 shows an exemplary pseudo code of the method of FIG. 15, and parameters in the pseudo code of FIG. 15 are as already described above with reference to FIGS. 10 through 12.

In another example, the problem-solving system 10 may perform sampling only a predefined number of times (e.g., 10 times) and may select two child nodes that have been sampled the most, for example, the child nodes 155 and 156, as candidate search nodes.

According to the embodiment of FIG. 15, candidate search nodes may be selected easily and accurately using the confidence scores of nodes as sampling probabilities. Also, candidate search nodes that may hardly be selected by the greedy method may be selected by the sampling method. Thus, as a search may be conducted on a variety of paths, an unexpectedly high-quality solution may be derived.

It will hereinafter be described how to evaluate the values of candidate search nodes with reference to FIGS. 17 through 19.

Figure 17:
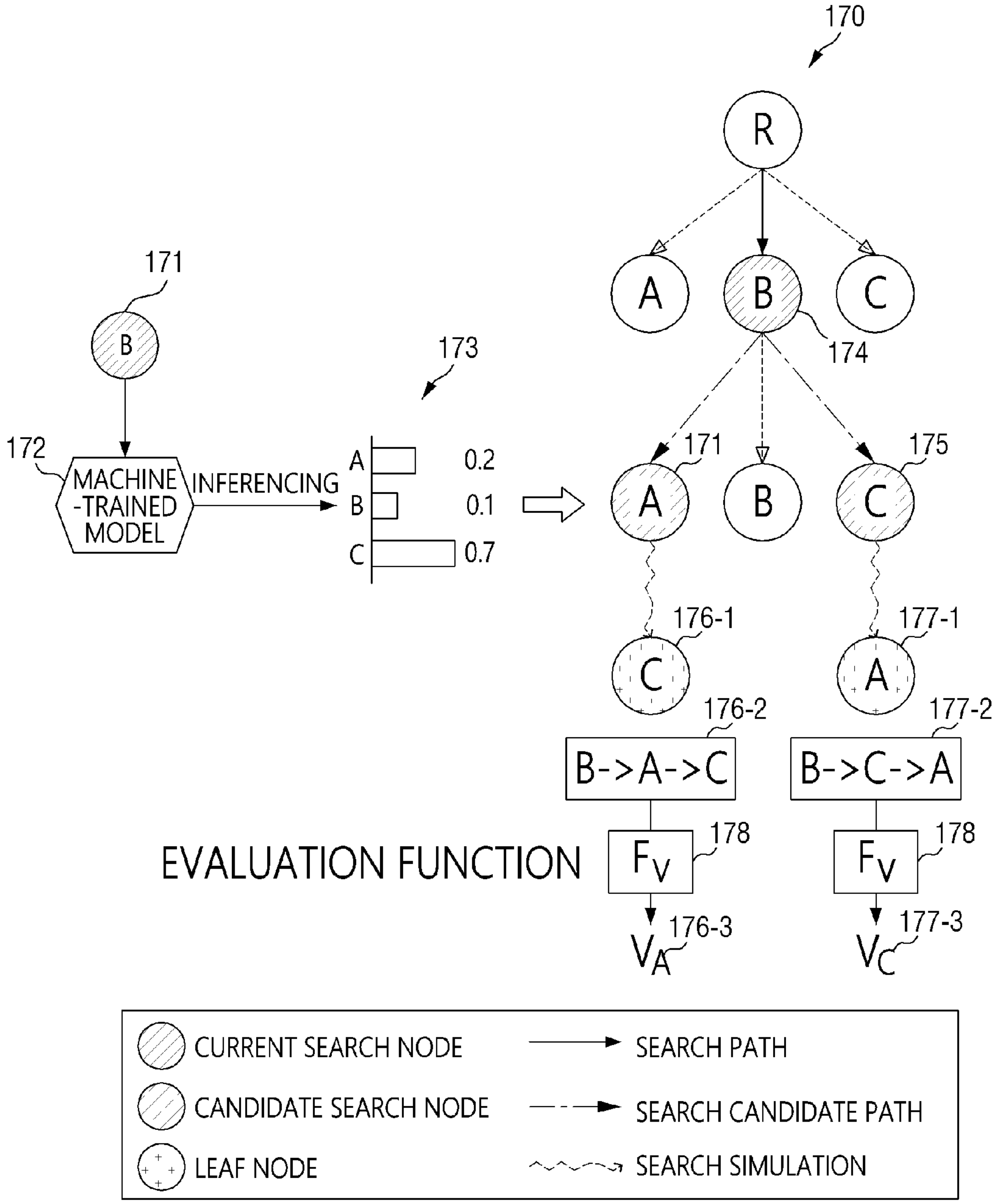
FIG. 17 illustrates a method of evaluating the values of candidate search nodes according to an embodiment of the present disclosure.

FIG. 17 illustrates a method of evaluating the values of candidate search nodes according to an embodiment of the present disclosure.

The embodiment of FIG. 17 relates to a method of evaluating the values of candidate search nodes via search simulation in the greedy method (i.e., via greedy rollout). Here, the values of the candidate search nodes may refer to the evaluation scores of solutions corresponding to predicted paths derived via search simulation.

Referring to FIG. 17, the problem-solving system 10 may perform inference for acquiring confidence scores 173 via machine-trained model 172 and may perform search simulation on each of candidate search nodes 171 and 175 by selecting a node with a highest confidence score (e.g., a node 176-1) as a next search node. The search simulation may be continued until leaf nodes 176-1 and 177-1 are reached for the candidate search nodes 171 and 175, respectively, and as a result, predicted paths 176-2 and 177-2 may be derived for the candidate search nodes 171 and 175, respectively.

Thereafter, the problem-solving system 10 may evaluate predicted solutions corresponding to the predicted paths 176-2 and 177-2 using an evaluation function 178. Thereafter, the problem-solving system 10 may determine the results of the evaluation as values 176-3 and 177-3 of the candidate search nodes 171 and 175 and may determine a next search node for a current search node 174 based on the values 176-3 and 177-3 of the candidate search nodes 171 and 175.

FIG. 18 shows an exemplary pseudo code for the method of FIG. 17. Referring to FIG. 18, se denotes a path from a root node to node e, $s_n$ denotes a path from the root node to node n, and $\tau_e$ denotes a search path (or a selected path) to a leaf node. The other parameters in the pseudo code of FIG. 18 are as already described above with reference to FIGS. 10 through 12.

A method of evaluating the values of candidate search nodes according to another embodiment of the present disclosure will hereinafter be described.

The present embodiment relates to a method of evaluating the values of candidate search nodes via search simulation in the sampling method (i.e., sampling rollout).

Specifically, the problem-solving system 10 may perform sampling using the confidence scores of items, obtained by inferencing performed by a machine-trained model, as sampling probabilities and may perform search simulation on each of candidate search nodes by selecting nodes that have been sampled. As already mentioned above, a search for each of the candidate search nodes may be continued until a leaf node is reached, and as a result, a predicted path may be derived for each of the candidate search nodes.

According to the present embodiment, the problem-solving system 10 may repeatedly perform search simulation on each of the candidate search nodes a predefined number of times. Alternatively, the problem-solving system 10 may perform search simulation until a predefined number of predicted paths are derived for each of the candidate search nodes. Then, the problem-solving system 10 may evaluate predicted solutions corresponding to the predefined number of predicted paths and may determine the values of the candidate search nodes based on the results of the evaluation (or evaluation scores). For example, the problem-solving system 10 may determine the highest evaluation scores or highest average evaluation scores (e.g., arithmetic scores or weighted average scores using how many times predicted solutions have been derived as a weight) of the candidate search nodes as the values of the candidate search nodes.

The predefined number may be fixed in advance or may be variable depending on the circumstances. For example, the predefined number may vary depending on the performance of a machine-trained model, the confidence scores of nodes of a search tree, and the amount of resources available for the problem-solving system 10. For example, the predefined number may be set high to search for a large number of paths, when the machine-trained model has poor performance, or may be set high when there is a plenty of resources available for the problem-solving system 10.

FIG. 19 shows an exemplary pseudo code for a method of evaluating the values of candidate search nodes according to another embodiment of the present disclosure. Referring to FIG. 19, K refers to the number of times to perform sampling. The other parameters in the pseudo code of FIG. 19 are as already described above with reference to FIGS. 10 through 12.

Applications of the problem-solving system 10 and the problem-solving method of FIG. 4 will hereinafter be described with reference to FIGS. 20 and 21.

Figure 20:
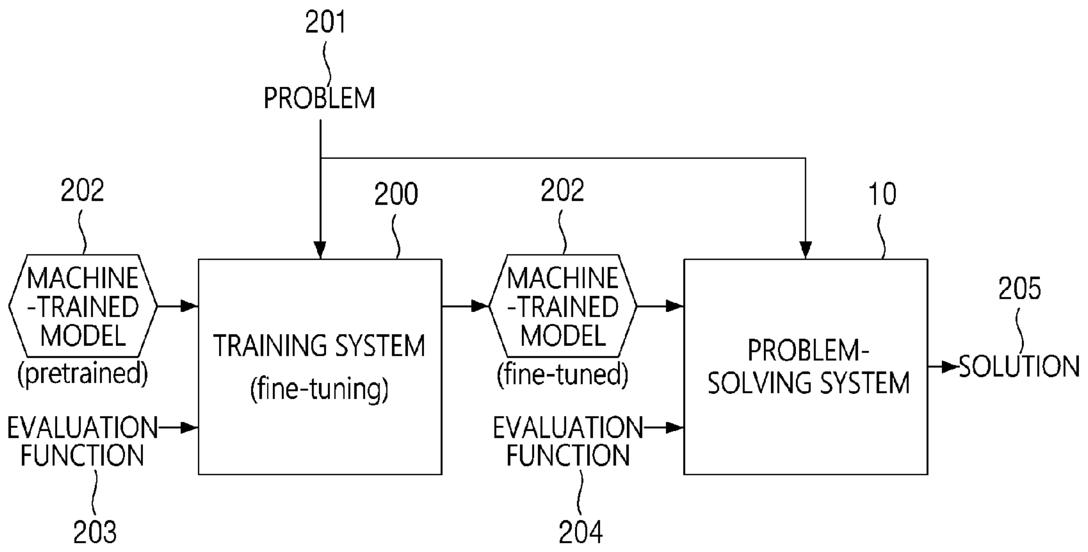
FIGS. 20 and 21 are block diagrams illustrating exemplary applications of the problem-solving system of FIG. 1 (or the problem-solving method of FIG. 4)

FIG. 20 is a block diagram illustrating an exemplary application of the problem-solving system 10.

Referring to FIG. 20, the problem-solving system 10 may operate in connection with a training (or learning) system 200.

The training system 200 may be a system that trains or additionally trains a machine-trained model 202 to improve the problem solving capability of the machine-trained model 202 for a target problem 201. For example, if the machine-trained model 202 is a model that has learned problems similar to the target problem 201 (e.g. more universal or easier problems), the training system 200 may perform additional training (e.g., fine tuning) on the machine-trained model 202 using an evaluation function 203 associated with the target problem 201. Specifically, the training system 200 may be, for example, a system training or additionally training the machine-trained model 202 via an active search or an efficient active search. In this case, the target problem 201 may be a combinatorial optimization problem, and the evaluation function 203 may be, for example, a reward function for use in reinforcement learning.

The active search and the efficient active search are already well known in the art to which the present disclosure pertains, and thus, detailed descriptions thereof will be omitted (for more information, see the articles entitled "Neural Combinatorial Optimization with Reinforcement Learning" and "Efficient Active Search for Combinatorial Optimization Problems").

The problem-solving system 10 may derive a solution 205 to the target problem 201 based on a tree search using the machine-trained model 202, which is additionally trained by the training system 200, and the evaluation function 204. Accordingly, the quality of the solution 205 may be further improved.

Another exemplary application of the problem-solving system 10 will hereinafter be described with reference to FIG. 21. For clarity, the embodiment of FIG. 21 will hereinafter be described, focusing mainly on the differences with the embodiment of FIG. 20.

Figure 21:
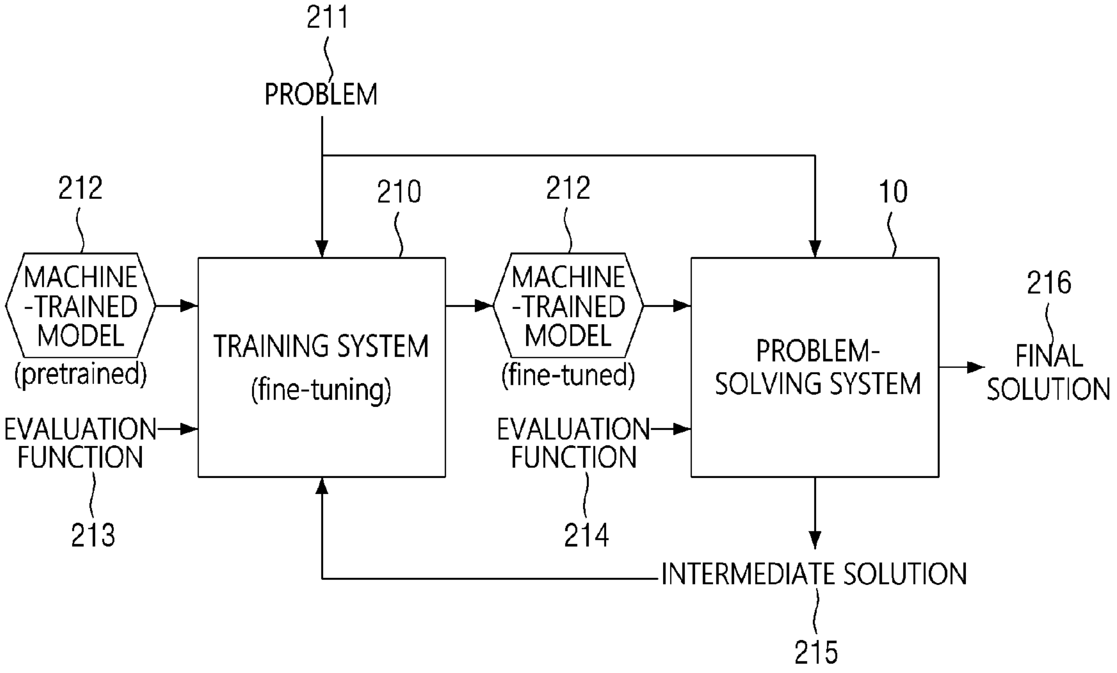

Referring to FIG. 21, the problem-solving system 10 may operate in connection with a training system 210, and an intermediate solution 215 to a target problem 211, derived by the problem-solving system 10, may be used as training data for a machine-trained model 212.

Specifically, the training system 210 may train or additionally train the machine-trained model 212 to improve the problem solving capability of the machine-trained model 212 for the target problem 211. As already described above, the training system 210 may additionally train the machine-trained model 212 using an evaluation function 213 and may provide the additionally-trained machine-trained model 212 to the problem-solving system 10.

Thereafter, the problem-solving system 10 may derive the intermediate solution 215 using the machine-trained model 212 and an evaluation function 214 and may provide the intermediate solution 215 to the training system 210. Thereafter, the training system 210 may further train the machine-trained model 212 using the intermediate solution 215 as training data. These processes may be understood as imitation learning considering the intermediate solution 215 as an expert's experience. The intermediate solution 215 may be a solution derived by the problem-solving system 10 using an intermediate machine-trained model 212 that has not yet been additionally trained (or fine-tuned) fully, and a final solution 216 may be a solution derived by the problem-solving system 10 using a machine-trained model 212 that has been additionally trained fully.

Thereafter, the problem-solving system 10 may derive the intermediate solution 215 or the final solution 216 using the machine-trained model 212.

The above-described processes may be repeatedly performed to gradually improve the performance of the machine-trained model 212. For example, the problem-solving system 10 may repeatedly perform the above-described processes until a final solution 216 that satisfies a set of quality criteria for the target problem 211 may be derived.

Experimental results for the performance of the problem-solving system 10 will hereinafter be described with reference to FIGS. 22 and 23.

Figure 22:
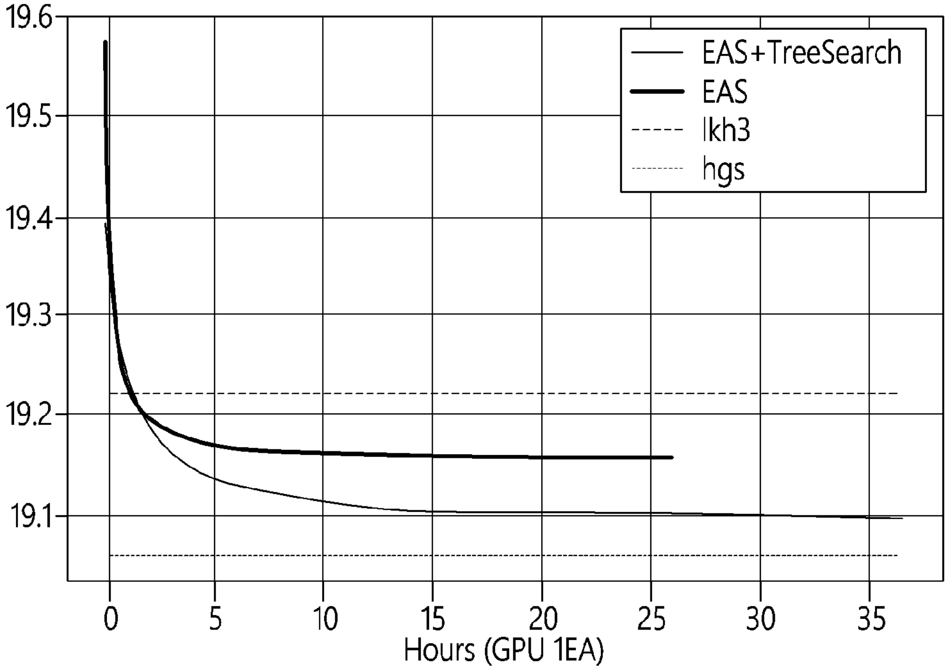
FIGS. 22 and 23 are graphs showing experimental results for the performance of the problem-solving system of FIG. 1 (or the problem-solving method of FIG. 4)
Figure 23:
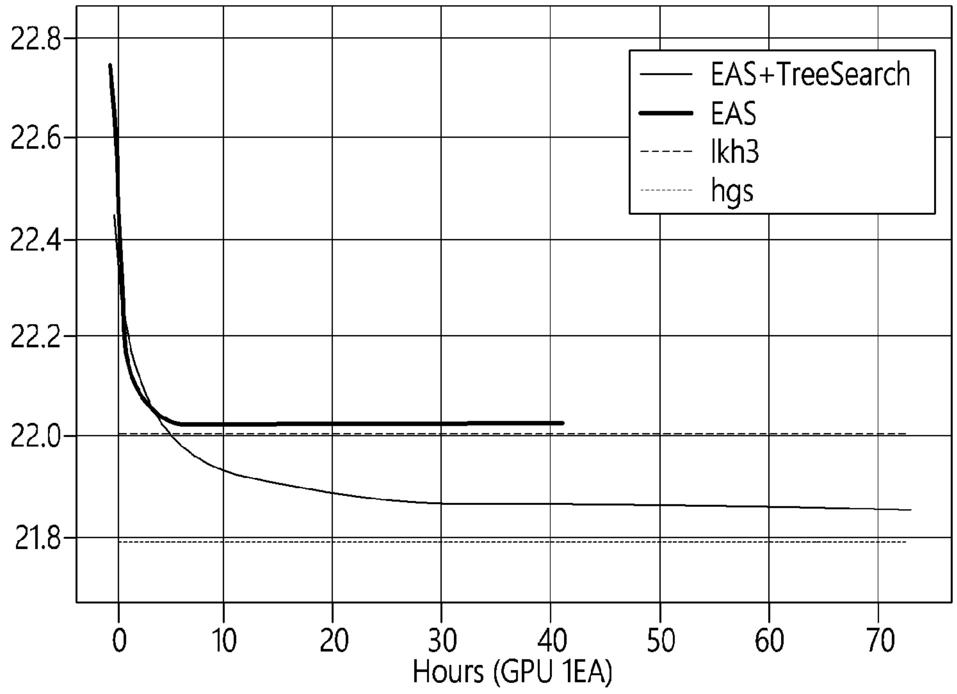

FIGS. 22 and 23 are graphs showing experimental results for the performance of the problem-solving system 10 for "CVRP150" and "CVRP200" problems. Referring to FIGS. 22 and 23, the X axis represents the amount of time taken to derive each solution, the Y axis represents the evaluation score of each derived solution (i.e., vehicle operating cost). A neural network model that trained CVRP100 was used to experiment the performance of the problem-solving system. Also, referring to FIGS. 22 and 23, "lkh3" and "hgs," which are comparison examples, denote a Lin-Kernighan-Helsgaun algorithm and a hybrid genetic search algorithm, respectively, specialized for CVRP, "EAS" denotes an effective active search, and "EAS+TreeSearch" denotes the use of both the effective active search and the problem-solving system 10 (see FIG. 21).

As shown in FIGS. 22 and 23, the quality of each derived solution may be considerably improved by further training a neural network model using an intermediate solution derived by the problem-solving system 10. Specifically, the quality of each derived solution appears to be almost similar to the hybrid genetic search algorithm specialized for CVRP, and this means that the performance of a neural network may be further improved via additional training and the search of a search tree may be effectively conducted (i.e., at low cost by accurately evaluating the value of each candidate search node).

An exemplary computing device that may implement the problem-solving system 10 will hereinafter be described with reference to FIG. 24.

Figure 24:
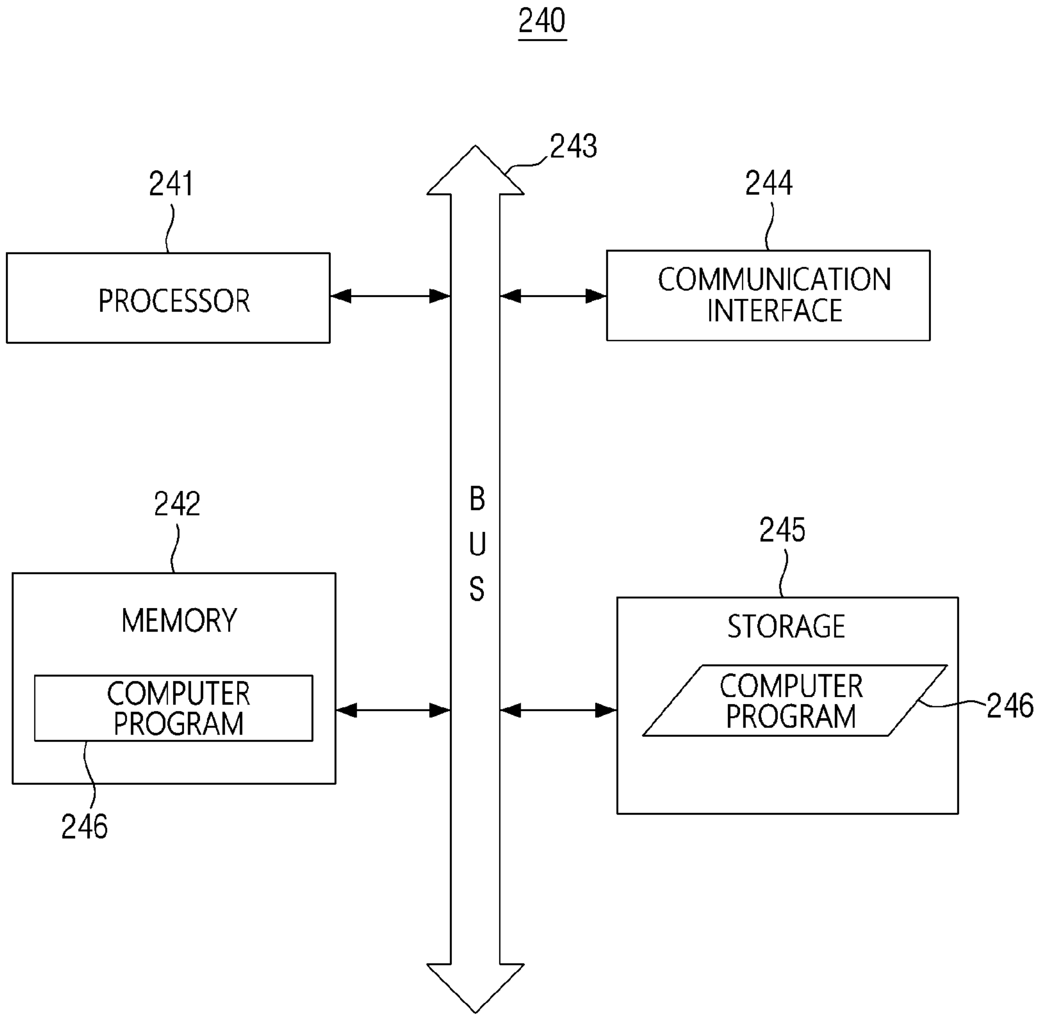
FIG. 24 is a hardware configuration view of a computing device that may implement the problem-solving system of FIG. 1.

FIG. 24 is a hardware configuration view of a computing device 240.

Referring to FIG. 24, the computing device 240 may include at least one processor 241, a bus 243, a communication interface 244, a memory 242, which loads a computer program 246 to be executed by the processor 241, and a storage 245, which stores the computer program 246. FIG. 24 illustrates only components of the computing device 240 that are associated with the present disclosure, but obviously, the computing device 240 may further include various other general-purpose components. That is, the computing device 240 may also include various components in addition to those illustrated in FIG. 24. Also, in some embodiments, some of the components illustrated in FIG. 24 may be omitted from the computing device 240. The elements of the computing device 240 will hereinafter be described.

The processor 241 may control the general operations of the other elements of the computing device 240. The processor 241 may be configured to include at least one of a central processing unit (CPU), a microprocessor unit (MPU), a microcontroller unit (MCU), a GPU, and another arbitrary processor that is already well known in the art to which the present disclosure pertains. The processor 241 may perform an operation for at least one application or program for executing operations and/or methods according to some embodiments of the present disclosure. The computing device 240 may include at least one processor 241.

The memory 242 may store various data, commands, and/or information. The memory 242 may load the computer program 246 from the storage 245 to execute the operations and/or methods according to some embodiments of the present disclosure. The memory 242 may be implemented as a volatile memory such as a random-access memory (RAM), but the present disclosure is not limited thereto.

The bus 243 may provide a communication function between the other elements of the computing device 240. The bus 243 may be implemented as an address bus, a data bus, a control bus, or the like.

The communication interface 244 may support wired/wireless Internet communication for the computing device 240. The communication interface 244 may also support various communication methods other than Internet communication. To this end, the communication interface 244 may be configured to include a communication module that is well known in the art to which the present disclosure pertains. Alternatively, in some embodiments, the communication interface 244 may not be provided.

The storage 245 may non-transitorily store at least one computer program 246. The storage 245 may be configured to include a nonvolatile memory such as a read-only memory (ROM), an erasable programmable ROM (EPROM), an electrically erasable programmable ROM (EEPROM), or a flash memory, a hard disk, a removable disk, or another arbitrary computer-readable recording medium that is well known in the art to which the present disclosure pertains.

The computer program 246 may include one or more instructions that allow the processor 241 to perform the operations and/or methods according to some embodiments of the present disclosure, when loaded in the memory 242. That is, the processor 241 may perform the operations and/or methods according to some embodiments of the present disclosure by executing the loaded instructions.

For example, the computer program 246 may include instructions for performing the operations of: setting a current search node on a search tree corresponding to the solution space of a target problem; selecting a plurality of candidate search nodes from among the child nodes of the current search node; selecting a next search node from among the candidate search nodes based on the results of search simulation for the candidate search nodes; and determining a solution to the target problem based on the result of a search performed using the next search node. In this example, the problem-solving system 10 may be implemented by the computing device 240.

The exemplary computing device 240 that may implement the problem-solving system 10 has been described so far with reference to FIG. 24.

Embodiments of the present disclosure have been described above with reference to FIGS. 1 through 24, but the present disclosure is not limited thereto and may be implemented in various different forms. It will be understood that the present disclosure may be implemented in other specific forms without changing the technical spirit or gist of the present disclosure. Therefore, it should be understood that the embodiments set forth herein are illustrative in all respects and not limiting.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for solving a target problem using a machine-trained model, the method being performed by at least one computing device and comprising:

setting at least one current search node on a search tree corresponding to a solution space of a target problem;

selecting candidate search nodes from among child nodes of the at least one current search node based on confidence scores of items output by the machine-trained model, wherein the machine-trained model is configured to perform inferencing in an autoregressive manner to output the confidence scores of the multiple items in stages, each stage using a result of a previous inferencing process to perform a current inferencing process, and wherein each child node of the at least one current search node corresponds to a respective item inferred by the machine-trained model such that a number of the candidate search nodes being equal to a number of items inferred by a machine-trained model;

determining at least one next search node from among the candidate search nodes based on results of search simulation for the candidate search nodes, wherein the search simulation includes:

deriving predicted paths for the candidate search nodes by iteratively applying the machine-trained model from the candidate search nodes such that leaf nodes of the search tree are reached, and evaluating predicted solutions corresponding to the predicted paths using an evaluation function associated with the target problem; and determining a solution to the target problem based on a result of a search using the at least one next search node, the determining comprising evaluating solutions corresponding to search paths derived from the search using the evaluation function associated with the target problem and selecting the solution based on results of the evaluating.

2. The method of claim 1, wherein the setting the at least one current search node comprises setting a plurality of current search nodes, the plurality of current search nodes being on a same level on the search tree.

3. The method of claim 2, wherein a number of next search nodes is equal to a number of the plurality of current search nodes.

4. The method of claim 1, wherein the at least one current search node includes a first node and a second node, and a search of a first subtree having the first node as its root node and a search of a second subtree having the second node as its root node are performed in parallel.

5. The method of claim 1, wherein the at least one current search node includes a first node and a second node that are on a same level on the search tree, and a number of candidate search nodes selected from among child nodes of the first node is equal to a number of candidate search nodes selected from among child nodes of the second node.

6. The method of claim 1, wherein the selecting the candidate search nodes comprises:

performing sampling using confidence scores of items acquired as a result of inferencing performed by the machine-trained model; and selecting the candidate search nodes based on a result of the sampling.

7. The method of claim 1, wherein the selecting the candidate search nodes comprises selecting the candidate search nodes using another machine-trained model, and wherein the another machine-trained model is a model trained to receive information of the child nodes and infer the candidate search nodes based on the received information.

8. The method of claim 1, wherein the candidate search nodes include a first candidate search node and a second candidate search node, and search simulation for the first candidate search node and search simulation for the second candidate search node are performed in parallel.

9. The method of claim 1, wherein the determining the at least one next search node comprises:

deriving predicted paths for the candidate search nodes by performing search simulation, which selects the at least one next search node based on confidence scores of items acquired as a result of inferencing performed by the machine-trained model;

evaluating predicted solutions corresponding to the predicted paths using an evaluation function associated with the target problem; and determining the at least one next search node from among the candidate search nodes based on results of the evaluating.

10. The method of claim 1, wherein the determining the at least one next search node comprises:

evaluating values of the candidate search nodes via sampling-based search simulation; and determining the at least one next search node from among the candidate search nodes based on the evaluated values, and wherein the evaluating the values of the candidate search nodes comprises:

deriving a plurality of predicted paths for a particular candidate search node by repeatedly performing the search simulation using, as sampling probabilities, confidence scores of items acquired as a result of inferencing performed by the machine-trained model;

evaluating predicted solutions corresponding to the plurality of predicted paths using an evaluation function associated with the target problem; and determining a value of the particular candidate search node based on results of the evaluating the predicted solutions.

11. The method of claim 1, wherein the at least one next search node includes a first node and a second node, and wherein the determining the solution to the target problem comprises:

deriving a first path and a second path passing through the first node and the second node, respectively, on the search tree;

evaluating solutions corresponding to the first path and the second path using an evaluation function associated with the target problem; and determining the solution to the target problem based on results of the evaluating.

12. The method of claim 1, further comprising:

acquiring an additionally-trained machine-trained model using the determined solution to the target problem; and deriving the solution to the target problem again using the acquired machine-trained model.

13. A system for solving a target problem comprising:

at least one processor; and a memory configured to store program code and a machine-trained model associated with a target problem, the program code comprising:

setting code configured to cause the at least one processor to set at least one current search node on a search tree corresponding to a solution space of the target problem;

selecting code configured to cause the at least one processor to select candidate search nodes from among child nodes of the at least one current search node based on confidence scores of items output by the machine-trained model, wherein the machine-trained model is configured to perform inferencing in an autoregressive manner to output the confidence scores of the multiple items in stages, each stage using a result of a previous inferencing process to perform a current inferencing process, and wherein each child node of the at least one current search node corresponds to a respective item inferred by the machine-trained model such that, a number of the candidate search nodes being equal to a number of items inferred by the machine-trained model;

first determining code configured to cause the at least one processor to determine at least one next search node from among the candidate search nodes based on results of search simulation for the candidate search nodes, wherein the search simulation includes:

deriving predicted paths for the candidate search nodes by iteratively applying the machine-trained model from the candidate search nodes such that leaf nodes of the search tree are reached, and evaluating predicted solutions corresponding to the predicted paths using an evaluation function associated with the target problem; and second determining code configured to cause the at least one processor to determine a solution to the target problem based on a result of a search using the at least one next search node, and evaluate solutions corresponding to search paths derived from the search using the evaluation function associated with the target problem and selecting the solution based on results of the evaluating.

14. A non-transitory computer-readable recording medium storing program code executable by at least one processor, the program code comprising:

setting code configured to cause the at least one processor to set at least one current search node on a search tree corresponding to a solution space of a target problem;

selecting code configured to cause the at least one processor to select candidate search nodes from among child nodes of the at least one current search node based on confidence scores of items output by the machine-trained model, wherein the machine-trained model is configured to perform inferencing in an autoregressive manner to output the confidence scores of the multiple items in stages, each stage using a result of a previous inferencing process to perform a current inferencing process, and wherein each child node of the at least one current search node corresponds to a respective item inferred by the machine-trained model such that, a number of the candidate search nodes being equal to a number of items inferred by a machine-trained model;

first determining code configured to cause the at least one processor to determine at least one next search node from among the candidate search nodes based on results of search simulation for the candidate search nodes, wherein the search simulation includes:

deriving predicted paths for the candidate search nodes by iteratively applying the machine-trained model from the candidate search nodes such that leaf nodes of the search tree are reached, and evaluating predicted solutions corresponding to the predicted paths using an evaluation function associated with the target problem; and second determining code configured to cause the at least one processor to determine a solution to the target problem based on a result of a search using the at least one next search node, and evaluate solutions corresponding to search paths derived from the search using the evaluation function associated with the target problem and selecting the solution based on results of the evaluating.

* * * * *